United States Patent [19]
Block

[11] 4,091,680
[45] May 30, 1978

[54] FORCE TRANSDUCER HAVING A LINEAR TRANSFER CHARACTERISTIC

[75] Inventor: Barry Block, Los Altos Hills, Calif.

[73] Assignee: Diax, Los Altos Hills, Calif.

[21] Appl. No.: 586,892

[22] Filed: Jun. 16, 1975

[51] Int. Cl.² ............................................. G01P 15/08
[52] U.S. Cl. ...................................... 73/517 R; 73/654
[58] Field of Search ............. 73/71, 71.1, 71.2, 141 A, 73/517 R; 177/229; 267/160

[56] References Cited

U.S. PATENT DOCUMENTS

| 2,067,803 | 1/1937 | Thearle | 73/71.2 X |
| 2,332,994 | 10/1943 | Draper et al. | 73/71.2 |
| 2,696,592 | 12/1954 | Petroff | 73/71.2 |
| 2,702,186 | 2/1955 | Head et al. | 73/517 R |
| 2,767,973 | 10/1956 | Terveen et al. | 73/517 R |
| 3,321,964 | 5/1967 | Kooman | 73/141 A |
| 3,713,333 | 1/1973 | MacGeorge | 73/141 A |
| 3,837,222 | 9/1974 | Raskin | 73/141 A |

FOREIGN PATENT DOCUMENTS 974,519  11/1964  United Kingdom ............. 73/141 A Primary Examiner—Charles A. Ruehl

[57] ABSTRACT

The force transducer includes a composite spring structure having first and second folded cantilever leaf spring portions coupled to the region to receive the force to be measured. The first and second leaf spring portions extend outwardly from, and are angularly displaced with respect to each other, around an axis of sensitivity. Each folded cantilever leaf spring portion includes first and second generally parallel elongated leg portions extending outwardly from the axis of sensitivity with each of said leg portions being coupled together at the outer end by a coupling structure which is free to move both parallel to and perpendicular to the axis of sensitivity in response to displacement of the inner end of one of said leg portions relative to the other along the axis of sensitivity in response to application of the force to be measured to the inner ends of the leg portions. The leg portions are dimensioned to have a higher compliance along the axis of sensitivity than the compliance thereof perpendicular to the axis of sensitivity. Differential capacitance or piezoresistance strain gauges are the preferred method for deriving an output which is proportional to the component of applied force tending to displace one of the leg portions relative to the other along the axis of sensitivity. Squeeze film damping is the preferred method of damping the composite spring structure.

2 Claims, 11 Drawing Figures

U. S. Patent May 30, 1978 Sheet 1 of 2 4,091,680
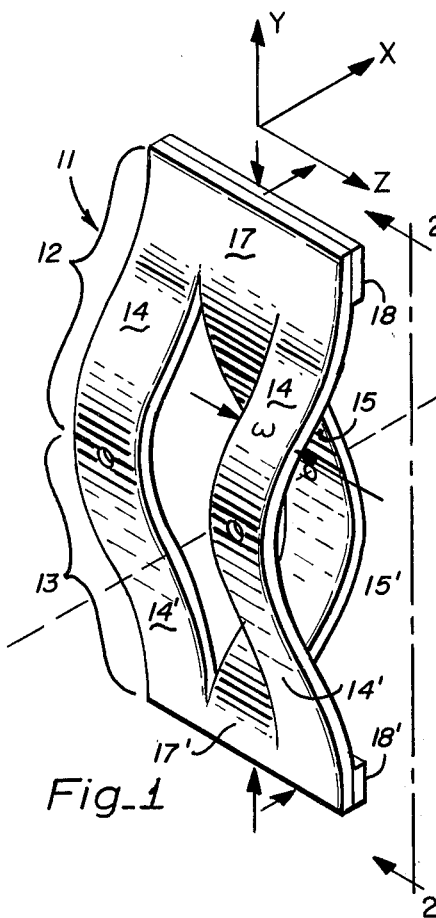
Fig_1
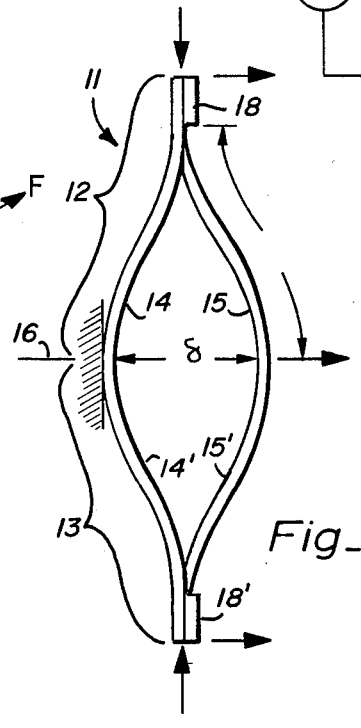
Fig_2
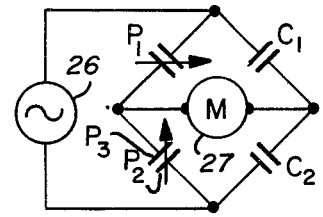
Fig_5
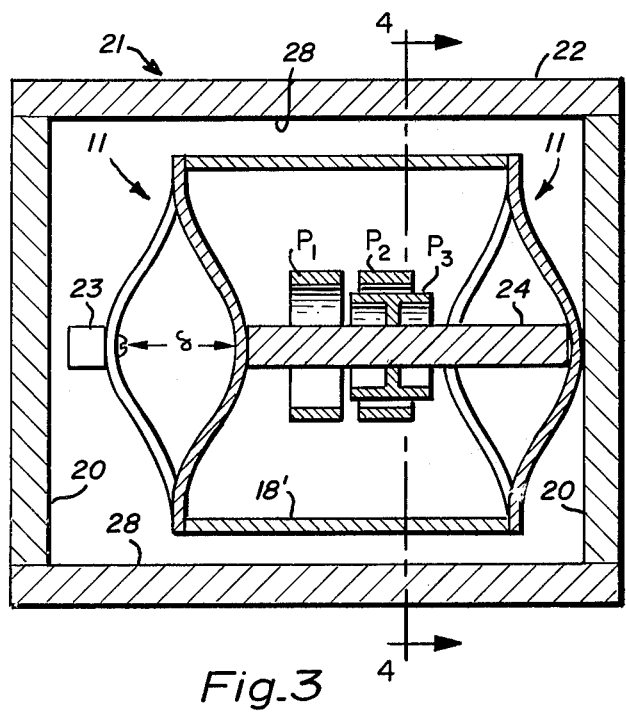
Fig_3
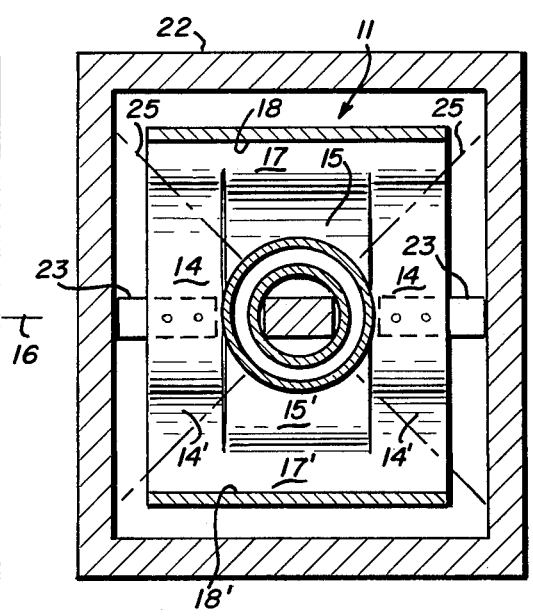
Fig_4

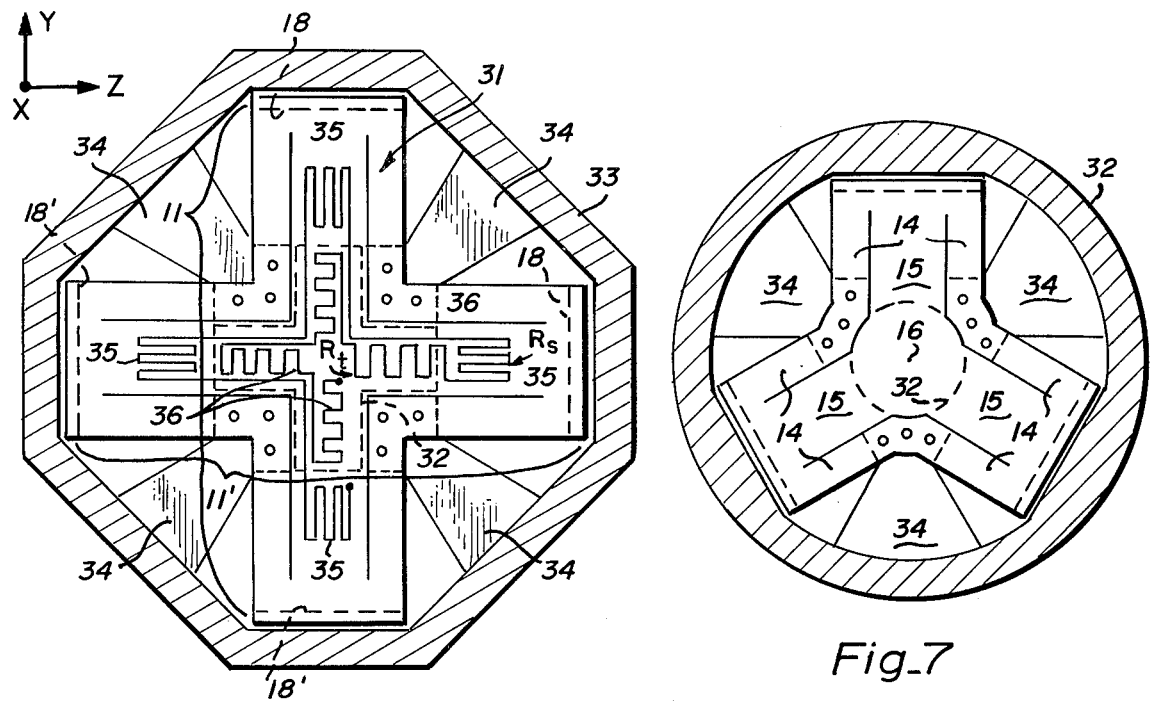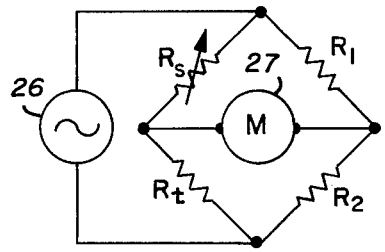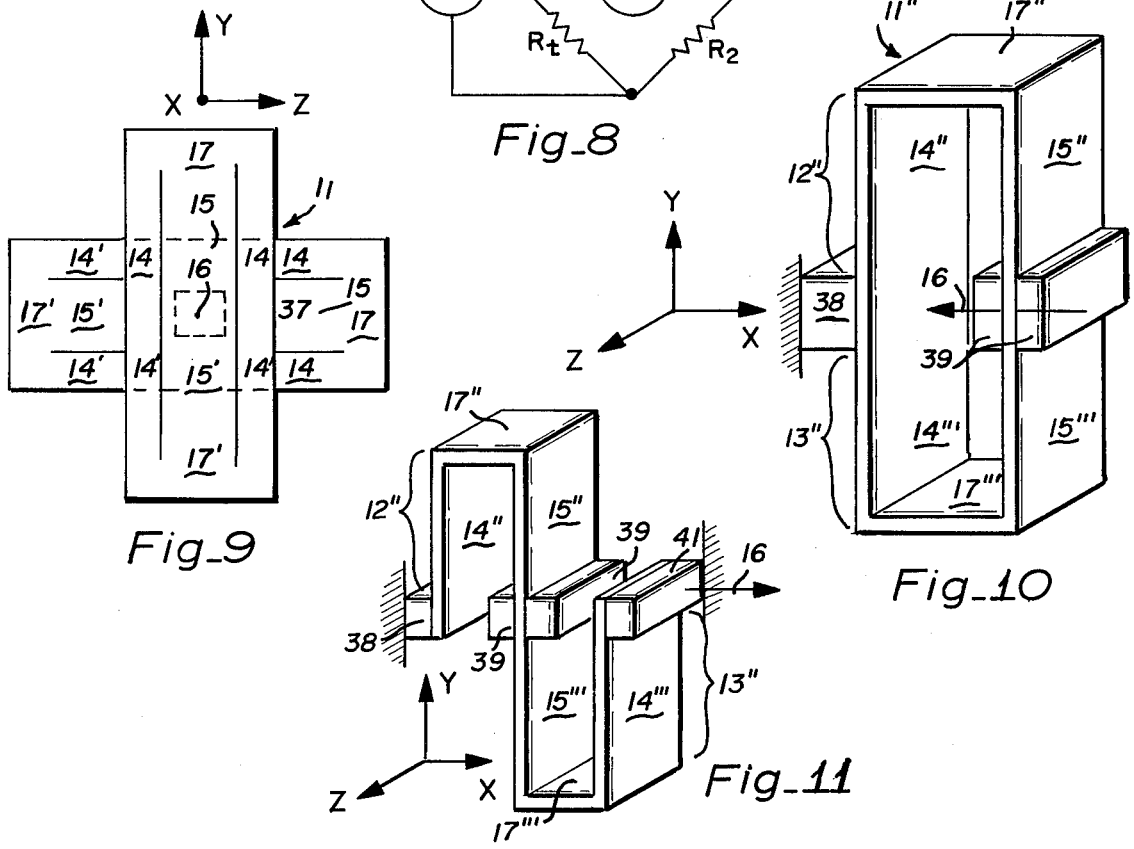

4,091,680

FORCE TRANSDUCER HAVING A LINEAR TRANSFER CHARACTERISTIC

BACKGROUND OF THE INVENTION

The present invention relates in general to force transducers and more particularly to such transducers having a linear transfer characteristic. Such transducers may be employed to advantage as accelerometers, gravity sensors, microphones, weight sensors, etc.

DESCRIPTION OF THE PRIOR ART

Heretofore, composite force transducers have included first and second folded cantilever leaf spring structures such as a pair of E-springs, extending radially from an axis of sensitivity and being coupled together at the axis of sensitivity and at their outer ends. Such a force transducer is disclosed in U.S. Pat. No. 2,702,186 issued Feb. 15, 1955.

In this prior arrangement, the two E-springs extended out from the axis of sensitivity in the same direction in axially spaced relation relative to the axis of sensitivity. In such a structure, displacement of the sensing mass, which was slung between the inner ends of the central leaf spring portions, in the direction of the axis of sensitivity produced a slight arcuate translation of the sensing mass, thus departing somewhat from the axis of sensitivity and thus producing a slight nonlinearity in the transfer characteristic of the force transducer. Therefore, it is desired to provide an improved force transducer of the folded cantilever leaf spring type wherein movement of the sensing mass along the axis of sensitivity is strictly rectilinear and linearly proportional to the applied force.

It is also known from the prior art to employ a differential capacitor readout for reading out displacement of the sensing mass along the axis of sensitivity. Such a differential capacitor readout is disclosed in U.S. Pat. No. 3,709,042 issued Jan. 9, 1973.

It is also known from the aforecited U.S Pat. No. 3,709,042 to provide squeeze film damping of the sensing mass by squeezing of a thin film of fluid disposed between the sensing mass and the adjacent wall of the transducer housing.

It is also known from the prior art to employ a plurality of folded cantilever leaf springs coupled to the sensing mass and disposed at angularly spaced locations about the axis of sensitivity. Such a force transducer is disclosed in U.S. Pat. No. 3,089,342 issued May 14, 1963. However, in this latter force transducer (accelerometer) the legs of the individual folded cantilever leaf springs, which are coupled to the sensing mass, extend circumferentially about the sensing axis. In such a case, axial displacement of the sensing mass as coupled to the folded cantilever leaf springs results in a slight rotational displacement of the sensing mass about the sensing axis. This rotational translation of the sensing mass introduces a nonlinearity in the transfer characteristic of the transducer which it is desired to avoid and also invites cross-coupling of forces orthogonal to the sensing axis into a displacement along the sensing axis.

SUMMARY OF THE PRESENT INVENTION

The principal object of the present invention is the provision of a force transducer having a linear transfer characteristic.

In one feature of the present invention, first and second folded cantilever leaf spring structures are coupled together to provide a composite spring structure having the first and second leaf spring portions extending outwardly from, and angularly displaced with respect to each other around, an axis of sensitivity of the composite spring structure. The outer ends of the folded cantilever springs are free to move both perpendicularly and parallel to the axis of sensitivity in response to axial displacement of the inner leg portions of the folded cantilever leaf springs along the axis of sensitivity. In this manner, displacement of the force sensing region of the composite structure along the axis of sensitivity is strictly rectilinear and in the direction of sensitivity, whereby the force transducer is caused to have a linear transfer characteristic.

In another feature of the present invention, the first and second folded cantilever leaf spring portions of the composite spring structure are angularly displaced by 180° relative to each other about the axis of sensitivity.

In another feature of the present invention the angularly displaced folded cantilever leaf springs are essentially coplanar and perpendicular to the axis of sensitivity.

In another feature of the present invention, the folded cantilever leaf springs are angularly displaced relative to each other about the axis of sensitivity of 90° or 120°.

In another feature of the present invention, two axially spaced composite folded cantilever leaf springs are coupled together at their outer ends by means of an axially directed structure extending parallel to the axis of sensitivity and providing squeeze film damping between the axially directed coupling structure and the adjacent housing.

In another feature of the present invention, cylindrical differential capacitor means are employed for deriving an output proportional to the displacement of the sensing structure.

In another feature of the present invention, piezoresistive elements are coupled to the composite folded cantilever spring structure in regions of maximum stress thereof for deriving an output proportional to the displacement of the sensing region of the spring structure along the sensing axis.

Other features and advantages of the present invention will become apparent upon a perusal of the following specification taken in connection with the accompanying drawings wherein:

BRIEF DESCRIPTION OF THE DRAWINGS

FIG. 1 is a perspective view of a composite dual folded cantilever spring structure incorporating features of the present invention, FIG. 2 is a side elevational view of the structure of FIG. 1 taken in the direction of the arrows 2—2, FIG. 3 is a longitudinal sectional view of a force transducer incorporating features of the present invention, FIG. 4 is a sectional view of the structure of FIG. 3 taken along line 4—4 in the direction of the arrows, FIG. 5 is a schematic circuit diagram for the differential capacitor readout circuit employed in the transducer of FIGS. 3 and 4, FIG. 6 is a transverse sectional view of a composite spring structure employing features of the present invention, FIG. 7 is a view similar to that of FIG. 6 depicting an alternative spring structure of the present invention, FIG. 8 is a schematic circuit diagram depicting a piezoresistive readout circuit shown in FIG. 6, FIG. 9 is an end view of a composite spring structure incorporating features of the present invention, FIG. 10 is a perspective view of an alternative composite spring structure incorporating features of the present invention, and FIG. 11 is a view similar to that of FIG. 10 depicting an alternative embodiment of the present invention.

DESCRIPTION OF THE PREFERRED EMBODIMENTS

Referring now to FIGS. 1 and 2 there is shown a composite spring structure 11 incorporating features of the present invention. The composite spring structure 11 includes a pair of oppositely directed folded cantilever spring components 12 and 13 each of the folded cantilever spring components 12 and 13 is of the E-shape, i.e., having a pair of outside leg portions 14 and a central leg portion 15 extending outwardly in a generally radial direction from an axis of sensitivity, namely the X-axis 16. Primed numbers have been employed for identifying corresponding parts of the lower spring 13. The outer end portions of the leaf springs 12 and 13 are joined together by a coupling structure 17. The outer leg portions 14 each have a width w which is half of the width of the central leg portion 15. The leaf leg portions 14 and 15 are preferably elongated and have a length e greater than their width.

The inner ends of the outer legs 14 are fixedly secured to a support structure. A force which it is desired to detect or measure is preferably applied to the central leg portion 15 at the intersection thereof with the sensing axis 16 so that the force to be measured is applied in the direction of the sensing axis 15 and between the inner ends of the leg portions 14 and 15.

In the undeflected state, the composite spring structure 11 lies in the Y-Z plane and upon the application of a force along the sensing axis 16 to the central leg 15, the composite spring structure 11 deflects as depicted in FIGS. 1 and 2 to produce a displacement δ in the direction of the sensing axis 16. The displacement δ is greatly exaggerated in the drawings for the sake of explanation. When the central leg portion 15 deflects along the sensing axis 16 the outer ends 17 and 17' move toward the sensing axis 16, i.e., in the Y direction as well as moving or translating in the X direction, that is, in a direction parallel to the sensing axis 16. Because the two spring structures 12 and 13 are coupled to each other in a balanced relationship the deflection of the inner ends of the central legs 15 and 15' is rectilinear and along the sensing axis 16. The spring structure 11 has the property that the force applied to it along the sensing axis is related to the displacement along the sensing axis by the following equation:

$$F_x = K[\frac{\delta}{l} + a(\frac{\delta}{l})^3]$$

Where K is a constant, e is the length of each cantilever leaf spring leg, δ is the displacement, and α is a number of the order of one (i.e., α = 1.05 independent of the beam material). It should be noted that the nonlinearity is of third order. The system dimensions are preferably chosen such that δ/e is on the order of 0.01 at full scale rated force such that the nonlinearity from this source is negligible.

The linear displacement of the displaceable leg portions 15 and 15' along the sensing axis 16, in response to an applied force, can be sensed by any one or a number of various sensing elements. For example, it may be sensed by a differential capacitive detector of the type to be described below with regard to FIGS. 3–5, or it may be detected by strain gauges or piezoresistive elements coupled to the spring structure in regions of maximum stress as described below with regard to FIGS. 6 and 8.

As the central leg portions 15 and 15' deflect relative to the fixed leg portions 14 and 14', a twisting moment is generated in the outer regions 17 and 17' of the composite spring structure. In a preferred embodiment strengthening members 18 and 18' are secured to the outer regions 17 and 17' to prevent twisting distortion of the spring structure.

The composite spring structure 11 of FIGS. 1 and 2 is relatively immune to cross-coupling of forces in the Z direction because the leg portions are coplanar with the force. However, forces exerted in the Y direction will place the outer leg portions 14 of spring 12 in tension, whereas the central leg portion 15 will be placed in compression. Similarly, the lower spring portion 13 will have its outer legs placed in compression and its inner leg 15' placed in tension. Thus, spring 12 will cancel its longitudinal displacement of the central leg 15 against the longitudinal displacement of the outside legs 14, and similarly the same will occur for the lower spring portion 13. The limit to this canceling action is Euler's buckling limit and the buckling limit is much higher for spring structure 11 against forces in the Z direction than in the Y direction. Thus, the addition of other spring components similar to those of 12 and 13 and disposed at right angles to 12 and 13 as shown in FIGS. 6 and 9 and in other geometries such as shown in FIG. 7 can serve to substantially stiffen the composite spring structure against cross-coupling of the forces into a displacement along the sensing axis 16.

Referring now to FIGS. 3 and 4 there is shown an accelerometer 21 employing the composite spring structure 11 of the present invention. The accelerometer 21 includes a tubular housing of generally rectangular cross-section 22 having the inner ends of the outer leg portions 14 and 14' of the composite spring structures 11 fixedly secured to the housing 22 via bosses 23 extending in from the side walls of the housing 22. The outer end portions 17 and 17' of the two axially spaced springs 11 are coupled together via the intermediary of rigid plates 18 and 18'. The inner ends of the central leg portions 15 and 15' are coupled to an inertial mass 24 extending along the sensing axis 16 and slung between the axially spaced springs 11. A cylindrical capacitive plate P3 is coupled to the inertial mass for movement therewith, whereas two axially spaced cylindrical capacitor plates P1 and P2 are disposed coaxial with the central cylindrical plate P3. The outer plates P1 and P2 are supported from the inside wall of the housing 22 via insulative support structures 25 shown in phantom lines in FIG. 4. The capacitive plates P1, P2 and P3 are connected into an electrical circuit as shown in FIG. 5 and energized with an alternating electrical potential derived from a source 26. Axial displacement of the central capacitive plate P3 produces an electrical unbalance of the bridge circuit, including capacitors $C_1$ and $C_2$, which is detected by a meter 27 to derive an electrical output proportional to the linear displacement δ of the inertial mass in the composite spring structure of the accelerometer 21.

The cylindrical capacitive plates P1, P2 and P3 are shown out of scale due to exaggeration of the displacement δ. In actual practice, capacitive cylinders P1 and P2 are made substantially longer than one half of the axial length of cylindrical capacitive plate P3 so as to eliminate displacement dependent changes in the electric fringing fields associated with the ends of the mutually opposed portions of P3 and P1 and P2.

Squeeze film damping of the composite spring structure is obtained by providing close clearance between the plates 18 and 18' and the inside wall of the housing at 28. Additional squeeze film damping can be obtained between the planar surfaces of the individual spring structures 11 including those of the sensing mass 24 and end walls 20 of the housing 22. It should be noted that the displacements are vastly exaggerated in the drawings so as to depict the movements of the parts of the spring structure. Also shear film damping is obtained between the closely spaced mutually opposed faces of the capacitive plates P1, P2 and P3.

Referring now to FIG. 6 there is shown an alternative embodiment of the composite spring structure of the present invention. In the embodiment of FIG. 6 the spring structure 31 consists of two orthogonally coupled composite spring structures 11 and 11' with the inner ends of individual E-spring structures coupled to a central inertial mass 32 extending along the sensing axis 16 and slung inbetween this spring and an identical spring axially spaced therefrom. The inner ends of the outer legs 14 and 14' are fixedly secured to the housing 33 via bosses 34. As previously mentioned this orthogonally coupled composite spring is extremely rigid in the Y-Z plane and relatively compliant along the X axis or axis of sensitivity 16.

Displacement of the displaceable leg portions 15 and 15' is detected by meansof piezoresistors 35 deposited onto the central leg portions 15 near the junction thereof with the inertial mass 32. The piezoresistors are oriented on each of the legs with elongated elements extending parallel in the radial direction for detecting the stress in the individual legs. The piezoresistors 35 are series connected to form a displacement sensing resistor $R_\delta$.

A temperature compensating series of piezoresistors 36 are deposited on the portions of the legs which are fixedly secured to the inertial mass 32 and which overlay the end of the inertial mass so that they are located in a relatively strain free region. In ddition, they are oriented with their elongated elements normal to the legs 15 so as to reduce the pickup of stress in these regions. The resistors 36 are connected in series to form a temperature compensating resistor $R_t$. The two resistors $R_\delta$ and $R_t$ are connected in series and center tapped as shown in the circuit of FIG. 8 to form one side of a bridge balanced against resistors $R_1$ and $R_s$ forming the other side of the bridge. The bridge is energized with alternating current from a source 26 and unbalance of the bridge, which is a measure of the displacement of the inertial mass along the axis of sensitivity 16, is detected by the meter 27 detecting unbalance of the bridge.

Referring now to FIG. 7 there is shown an alternative embodiment to the structure of FIG. 6 wherein the individual E-shaped spring structures are coupled to the central inertial mass 32 at 120° intervals about the sensng axis 16.

Referring now to FIG. 9 there is shown an alternative embodiment of the composite spring structure wherein two composite spring structures 11 are coupled to opposite ends of an inertial mass 37 extending along the sensing axis 16. The spring structures 11 are oriented at 90° to each other about the sensing axis 16 to render the composite spring structure relatively stiff in all directions except along the sensing axis 16.

Referring now to FIG. 10 there is shown an alternative composite spring structure of the present invention wherein composite spring structure 11" consists of a first folded cantilever leaf spring structure 12" extending away from the sensing axis 16 in the +Y direction and a second folded cantilever spring structure 13" coupled to the first extending away from the sensing axis 16 in the −Y direction. Each of the folded cantilever leaf springs include a fixed leaf 14" and 14'" fixedly secured at its inner end to a support structure 38 and extending away to a coupling member 17" and 17'" for coupling to the outer end of the second leg portions 15" and 15'" of the folded cantilever spring 12" and 13". The inner ends of the displaceable leg portions 15" and 15 " are coupled to an inertial mass 39. The composite spring structure 11" is balanced in a manner similar to that previously described with regard to FIGS. 1 and 2 and displacement of the inertial mass along a sensing axis 16 is detected by any of the previously described displacement detecting systems.

Referring now to FIG. 11 there is shown an alternative embodiment to the structure of FIG. 10 wherein the second leaf spring portion 13" is axially displaced along the sensing axis 16 from the first portion12". The fixed leg portion 14'" of the second spring 13" is fixedly secured to a support 41 at its inner end. The composite spring structure of FIG. 11 is relatively stiff in the Y and Z direction and is compliant along the sensing axis 16.

The advantages of the force transducer of the present invention include, relatively large dynamic linear range with extremely small cross-coupling of force into the sensitive axis, improved linearity over the large dynamic range because the displacement is confined to a rectilinear axis of sensitivity, not a curve or an arc of sensitivity. The transducer of the present invention has the advantage over the prior art structures utilizing curvilinear springs in that the motion of the translatable members 15 in the present invention is confined to a rectilinear path as contrasted with the curvilinear spring device which imparts some rotational motion to the inertial mass. Thus, the present invention minimizes a kind of cross-coupling which comes from the inertial mass being displaced from the spring system motion axis.

What is claimed is:

1. In a method for converting an acceleration or gravitational force to an output, the steps of:
    coupling together first and second folded cantilever leaf spring structures into a composite spring structure so that said first and second ones of said folded cantilever leaf spring portions of the composite structure extend outwardly from, and are angularly displaced with respect to each other around, an axis of sensitivity of said composite spring structure, each of said first and second folded cantilever leaf springs being of the type including first and second generally parallel leg leaf spring portions extending outwardly from the axis of sensitivity and being coupled together at their outer ends by a coupling structure which is free to move both parallel to and perpendicular to the axis of sensitivity in response to displacement of the inner end of one of said leg portions relative to the other along the axis of sensitivity, and one of the inner end regions of said first and second leg portions being displaceable relative to the other along the axis of sensitivity in response to application of the force to be converted to an output, said leg portions being dimensioned to have a higher compliance along the axis of sensitivity than the compliance thereof perpendicular to the axis of sensitivity;

coupling a sensing mass essentially free of other structure to the inner end region of one of said displaceable leg portions of at least one of said folded cantilever leaf spring portion for increasing the force applied to said inner end of said displaceable leg portion relative to the other leg portion in response to a component of acceleration of said composite spring structure along the axis of sensitivity or in response to a component of gravitational force field applied to said composite spring structure along the axis of sensitivity;

deriving an output from said composite spring structure which is proportional to the component of applied force tending to displace said inner ends of one of said leg portions relative to the other along said axis of sensitivity; and squeeze film damping said displaceable leg portion of said folded cantilever spring by squeezing a film from in between said displaceable leg portion of said folded cantilever spring structure and an adjacent stationary wall portion spaced from said displaceable leg portion in the direction of the axis of sensitivity.

2. In an apparatus for converting an acceleration or a gravitational force to an output:

first and second folded cantilever leaf spring portions, each of said folded cantilever leaf spring portions including first and second generaly parallel leg portions extending outwardly from an axis of sensitivity, coupling means for coupling together the outer ends of said parallel leg portions, said coupling means being free to move both parallel to and perpendicular to the axis of sensitivity in response to displacement of the inner end of one of said leg portions relative to the inner end of the other leg portion, said leg portions being dimensioned to have a higher compliance along the axis of sensitivity that the compliance thereof perpendicular to the axis of sensitivity;

means for coupling together said first and second folded cantilever leaf spring portions into a composite spring structure so that said first and second ones of said folded cantilever spring portions of said composite structure extend outwardly from, and are angularly displaced with respect to each other around, said axis of sensitivity;

a sensing mass essentially free of other structutre coupled to said inner end region of one of said displaceable leg portions of at least one of said folded cantilever leaf spring portions for increasing the force applied to said displaceable leg portion relative to said other leg portion in response to a component of acceleration of said composite spring structure along the axis of sensitivity or in response to a component of gravitational force field applied to said composite spring structure along the axis of sensitivity;

means for deriving an output from said composite spring structure which is proportional to the component of applied force tending to displace said inner end of one of said leg portions relative to the other along said axis of sensitivity; and squeeze film damping means having a stationary wall portion disposed adjacent and closely spaced to said displaceable leg portion of said folded cantilever leaf spring portion for squeezing a film of fluid from in between said displaceable leg portion of said folded cantilever leaf spring and said stationary wall portion in response to displacement of said displaceable leg portion in the direction of the axis of sensitivity.

* * * * *